US012192331B2

(12) United States Patent
Goodman et al.

(10) Patent No.: US 12,192,331 B2
(45) Date of Patent: Jan. 7, 2025

(54) WEB BROWSER-BASED SECURE CRYPTOGRAPHIC KEY MANAGEMENT

(71) Applicant: Dell Products L.P., Round Rock, TX (US)

(72) Inventors: Bradley K. Goodman, Nashua, NH (US); John Henry Terpstra, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 415 days.

(21) Appl. No.: 17/708,709

(22) Filed: Mar. 30, 2022

(65) Prior Publication Data
US 2023/0318807 A1 Oct. 5, 2023

(51) Int. Cl.
*H04L 9/08* (2006.01)
*H04L 9/32* (2006.01)
*H04L 67/02* (2022.01)

(52) U.S. Cl.
CPC .......... *H04L 9/0825* (2013.01); *H04L 9/0877* (2013.01); *H04L 9/3247* (2013.01); *H04L 67/02* (2013.01)

(58) Field of Classification Search
CPC ... H04L 9/0825; H04L 9/0877; H04L 9/3247; H04L 67/02; H04L 9/0897
See application file for complete search history.

(56) References Cited

U.S. PATENT DOCUMENTS

| 2008/0022374 | A1* | 1/2008 | Brown | H04L 63/0823 726/5 |
| 2011/0138453 | A1* | 6/2011 | Verma | H04L 63/0815 726/8 |
| 2012/0124384 | A1* | 5/2012 | Livni | H04L 63/126 713/178 |
| 2014/0052993 | A1* | 2/2014 | Isozaki | H04L 63/0428 713/175 |

(Continued)

OTHER PUBLICATIONS

Microsoft, "TPM Fundamentals," https://docs.microsoft.com/en-us/windows/security/information-protection/tpm/tpm-fundamentals, Dec. 28, 2021, 7 pages.

(Continued)

*Primary Examiner* — Kambiz Zand
*Assistant Examiner* — Calvin Thanh Nguyen
(74) *Attorney, Agent, or Firm* — Ryan, Mason & Lewis, LLP

(57) ABSTRACT

An apparatus comprises a processing device configured to receive, at a web browser from a web-based service running on a web server, a request for signature of one or more messages using at least one cryptographic key pair comprising a public key made accessible to the web-based service running on the web server and a private key maintained in secure storage accessible to the web browser. The processing device is also configured to generate, at the web browser, one or more interface features permitting a given user to accept or deny the request for signature and, responsive to the given user accepting the request for signature of a given (Continued)

message, digitally signing the given message utilizing the private key of the cryptographic key pair. The processing device is further configured to provide, from the web browser to the web-based service, a response comprising the digital signature of the given message.

20 Claims, 6 Drawing Sheets

(56) References Cited

U.S. PATENT DOCUMENTS

| | | | |
|---|---|---|---|
| 2021/0258308 A1* | 8/2021 | Avetisov | H04L 9/3215 |
| 2022/0247579 A1* | 8/2022 | Bester | H04W 12/06 |
| 2023/0102116 A1* | 3/2023 | Chen | G06F 21/64 |
| | | | 726/25 |

OTHER PUBLICATIONS

Wikipedia, "Public-key Cryptography," https://en.wikipedia.org/wiki/Public-key_cryptography, Mar. 18, 2022, 8 pages.

The Open SSL Project Authors, "Open SSL—crypto," https://www.openssl.org/docs/man3.0/man7/crypto.html, Accessed Mar. 30, 2022, 7 pages.

* cited by examiner

WEB BROWSER-BASED SECURE CRYPTOGRAPHIC KEY MANAGEMENT

FIELD

The field relates generally to information processing, and more particularly to management of information processing systems.

BACKGROUND

Information processing systems, such as enterprise systems comprising information technology assets of an information technology infrastructure, may require authorization for various privileged actions to be performed on the information technology assets. For example, designated users may remotely authorize such privileged actions on the information technology assets. Such authorization may be based on using digital signatures, where the cryptographic keys used for such digital signature operations are kept and managed in a centralized control plane of an enterprise system operating the information technology infrastructure.

SUMMARY

Illustrative embodiments of the present disclosure provide techniques for web browser-based secure cryptographic key management.

In one embodiment, an apparatus comprises at least one processing device comprising a processor coupled to a memory. The at least one processing device is configured to perform the step of receiving, at a web browser from a web-based service running on a web server, a request for signature of one or more messages using at least one cryptographic key pair, the at least one cryptographic key pair comprising a public key made accessible to the web-based service running on the web server and a private key maintained in secure storage of the at least one processing device accessible to the web browser. The at least one processing device is also configured to perform the steps of generating, at the web browser, one or more interface features permitting a given user to accept or deny the request for signature of the one or more messages and, responsive to the given user accepting the request for signature of at least a given one of the one or more messages, digitally signing the given message utilizing the private key of the at least one cryptographic key pair. The at least one processing device is further configured to perform the step of providing, from the web browser to the web-based service running on the web server, a response comprising the digital signature of the given message.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
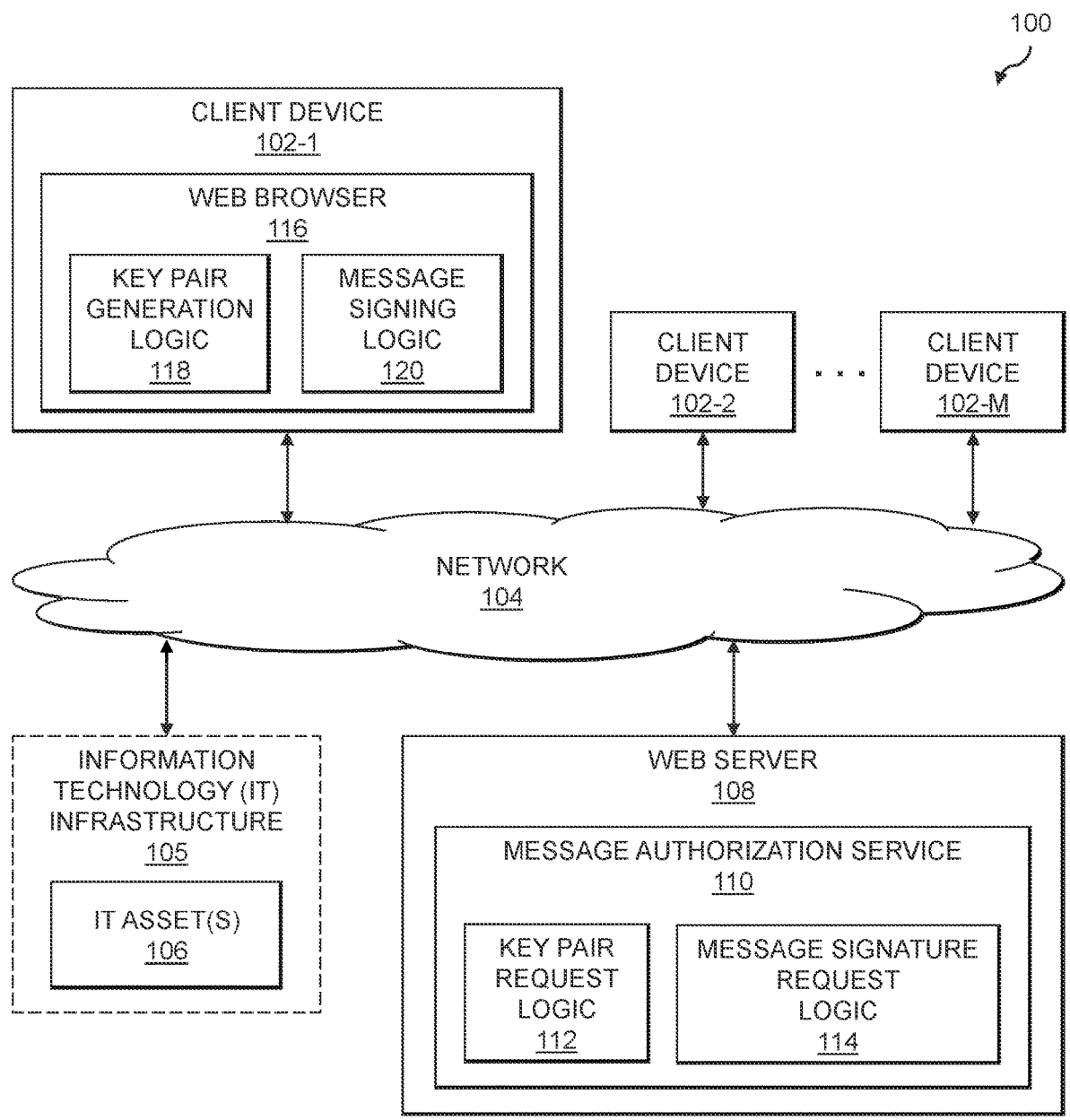
FIG. 1 is a block diagram of an information processing system configured for web browser-based secure cryptographic key management in an illustrative embodiment.

FIG. 1 shows an information processing system 100 configured in accordance with an illustrative embodiment. The information processing system 100 is assumed to be built on at least one processing platform and provides functionality for web browser-based secure cryptographic key management. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, and a web server 108. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The IT assets 106 of the IT infrastructure 105 may host applications that are utilized by respective ones of the client devices 102, such as in accordance with a client-server computer program architecture. In some embodiments, the applications comprise web applications designed for delivery from assets in the IT infrastructure 105 to users (e.g., of client devices 102) over the network 104. Various other examples are possible, such as where one or more applications are used internal to the IT infrastructure 105 and not exposed to the client devices 102. It is assumed that the IT assets 106 of the IT infrastructure 105 send requests that are to be digitally signed by users of the client devices 102 to authorize remote privileged actions. Such requests are routed via the web server 108, which implements a message authorization service 110 including key pair request logic 112 and message signature request logic 114.

The message authorization service 110 of the web server 108 is assumed to receive requests for authorization of remote privileged actions on the IT assets 106 of the IT infrastructure 105. Such authorization may include digitally signing documents, requests or other types of messages. To do so, the message authorization service 110 uses the key pair request logic 112 to request specific ones of the client devices 102 associated with designated users to create cryptographic key pairs (e.g., asymmetric public/private key pairs) used for digitally signing the messages. Assume, for example, that a particular request is directed to client device 102-1. The request may be sent to a web browser 116 running on the client device 102-1 which implements key pair generation logic 118 and message signing logic 120. The web browser 116 of the client device 102-1 will use the key pair generation logic to create the requested cryptographic key pair, and the web browser 116 will then return to the message authorization service 110 of the web server 108 a public key of the requested cryptographic key pair.

The message authorization service 110 of the web server 108 can use the public key to verify messages which are subsequently signed using a corresponding private key of the requested cryptographic key pair. The message authorization service 110 of the web server 108 may also distribute the public key to IT assets 106 of the IT infrastructure 105. When a message is to be signed using the requested cryptographic key pair, the message authorization service 110 will use the message signature request logic 114 to send a request to the web browser 116 of the client device 102-1 to sign the message. The web browser 116 will use the message signing logic 120 to sign the message with the private key of the requested cryptographic key pair (e.g., subject to approval by a user of the client device 102-1). The web browser 116 can then return the digital signature to the message authorization service 110 of the web server 108. The message authorization service 110 of the web server 108 then utilizes the digital signature to authorize one or more remote privileged actions on one or more of the IT assets 106 of the IT infrastructure 105. This may include, for example, generating a digital certificate which combines the original message with the digital signature returned by the web browser 116 of the client device 102-1.

Although not shown in FIG. 1 for clarity of illustration, other ones of the client devices 102-2 through 102-M may be similarly configured with web browsers implementing key pair generation logic and message signing logic.

In some embodiments, the message authorization service 110 of the web server 108 is used for an enterprise system. For example, an enterprise may subscribe to or otherwise utilize the message authorization service 110 for authorizing remote privileged actions on IT assets 106 of the IT infrastructure 105 operated by that enterprise. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

Although not explicitly shown in FIG. 1, one or more input-output devices such as keyboards, displays or other types of input-output devices may be used to support one or more user interfaces to the message authorization service 110 of the web server 108, as well as to support communication between the message authorization service 110 and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105 (e.g., where such management includes authorizing remote privileged actions on the IT assets 106, or on applications or other software that runs on the IT assets 106). The message authorization service 110 may be provided as a cloud service that is accessible by the given client device 102 to allow the user thereof to manage remote actions performed on IT assets 106 of the IT infrastructure 105. In some embodiments, the IT assets 106 of the IT infrastructure 105 are owned or operated by the same enterprise that operates the web server 108 (e.g., where an enterprise such as a business provides the message authorization service 110 to support the IT assets 106 it operates in the IT infrastructure 105). In other embodiments, the IT assets 106 of the IT infrastructure 105 may be owned or operated by one or more enterprises different than the enterprise which operates the message authorization service 110. Various other examples are possible.

In some embodiments, the client devices 102 may implement host agents (e.g., via web browsers) that are configured for creation of cryptographic key pairs, for secure storage thereof on the client devices 102, and for digitally signing messages. Host agents may similarly be deployed on the IT assets 106 of the IT infrastructure 105, for requesting signing of messages and for receiving digital signatures for authorizing privileged actions thereon. It should be noted that a "host agent" as this term is generally used herein may comprise an automated entity, such as a software entity running on a processing device. Accordingly, a host agent need not be a human entity.

The web server 108 in the FIG. 1 embodiment is assumed to be implemented using at least one processing device. Each such processing device generally comprises at least one processor and an associated memory, and implements one or more functional modules or logic for controlling certain features of the web server 108. In the FIG. 1 embodiment, the web server implements the message authorization service 110 comprising key pair request logic 112 and message signature request logic 114.

It is to be appreciated that the particular arrangement of the client devices 102, the IT infrastructure 105 and the web server 108 illustrated in the FIG. 1 embodiment is presented by way of example only, and alternative arrangements can be used in other embodiments. As discussed above, for example, the web server 108 (or portions of components thereof, such as one or more of the key pair request logic 112 and the message signature request logic 114) may in some embodiments be implemented internal to the IT infrastructure 105.

At least portions of the message authorization service 110 (e.g., the key pair request logic 112 and the message signature request logic 114) and the web browser 116 (e.g., the key pair generation logic 118 and the message signing logic 120) may be implemented at least in part in the form of software that is stored in memory and executed by a processor.

The web server 108 and other portions of the information processing system 100, as will be described in further detail below, may be part of cloud infrastructure.

The web server 108 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, and the web server 108, or components thereof, may be implemented on respective distinct processing platforms, although numerous other arrangements are possible. For example, in some embodiments at least portions of the web server 108 and the IT infrastructure 105 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, and the web server 108, or portions or components thereof, to reside in different data centers. Numerous other distributed implementations are possible.

Additional examples of processing platforms utilized to implement the information processing system 100 in illustrative embodiments will be described in more detail below in conjunction with FIGS. 5 and 6.

It is to be appreciated that these and other features of illustrative embodiments are presented by way of example only, and should not be construed as limiting in any way.

It is to be understood that the particular set of elements shown in FIG. 1 for web browser-based secure cryptographic key management is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for web browser-based secure cryptographic key management will now be described in more detail with reference to the flow diagram of FIG. 2. It is to be understood that this particular process is only an example, and that additional or alternative processes for web browser-based secure cryptographic key management may be used in other embodiments.

In this embodiment, the process includes steps 200 through 206. These steps are assumed to be performed by the web server 108 and client device 102-1 utilizing the message authorization service 110, the key pair request logic 112, the message signature request logic 114, the web browser 116, the key pair generation logic 118 and the message signing logic 120. The process begins with step 200, receiving, at a web browser (e.g., 116) of a given client device (e.g., 102-1) associated with a given user from a web-based service (e.g., 110) running on a web server (e.g., 108), a request for signature of one or more messages using at least one cryptographic key pair. The at least one cryptographic key pair comprises a public key made accessible to the web-based service running on the web server and a private key maintained in secure storage of the given client device accessible to the web browser.

In step 202, the web browser of the given client device generates one or more interface features permitting the given user to accept or deny the request for signature of the one or more messages. Responsive to the given user accepting the request for signature of at least a given one of the one or more messages, the given message is digitally signed in step 204 utilizing the private key of the at least one cryptographic key pair. A response comprising the digital signature of the given message is provided from the web browser of the given client device to the web-based service running on the web server in step 206.

The request for signature of the one or more messages may comprise a Hypertext Transfer Protocol (HTTP) response message, and step 200 may comprise parsing an HTTP Response Header of the HTTP response message to identify the one or more messages and the at least one cryptographic key pair to be utilized for signing the one or more messages. Parsing the HTTP Response Header of the HTTP response message may further comprise identifying: a redirect Uniform Resource Locator (URL), wherein the response comprising the digital signature of the given message is provided via the redirect URL; an identifier of a hash algorithm to be utilized for digitally signing the one or more messages; hash values of the one or more messages; and a domain where the request is valid, the domain defining a scope where use of the at least one cryptographic key pair is allowed to be used and a namespace where the at least one cryptographic key pair exists.

The response comprising the digital signature of the given message provided from the web browser of the given client device to the web-based service running on the web server may comprise an HTTP request message, the HTTP request message comprising an HTTP Request Header including the digital signature of the given message.

Figure 2:
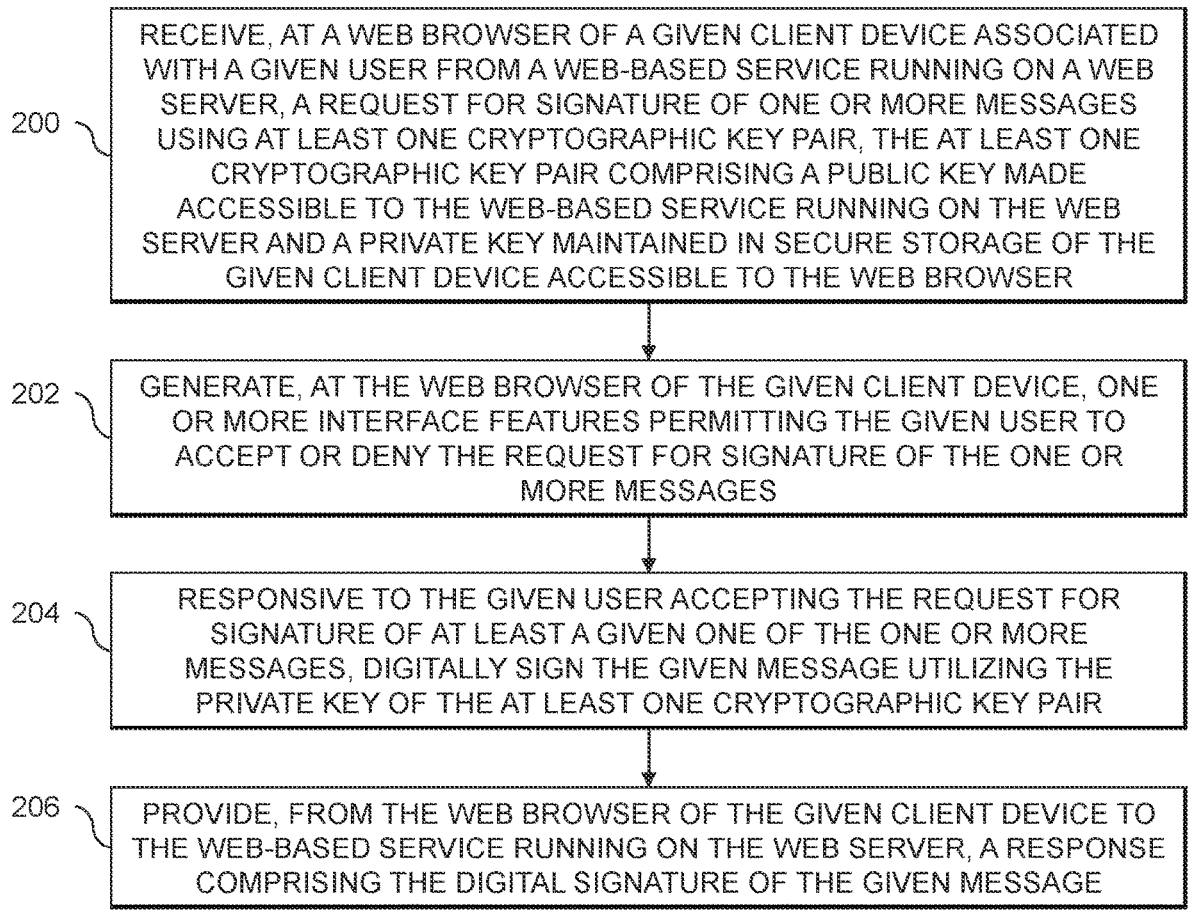
FIG. 2 is a flow diagram of an exemplary process for web browser-based secure cryptographic key management in an illustrative embodiment.

In some embodiments, the FIG. 2 process further includes receiving, at the web browser of the given client device from the web-based service running on the web server, a request to create the at least one cryptographic key pair, generating, utilizing the web browser of the given client device, the at least one cryptographic key pair, and providing, from the web browser of the given client device to the web-based service running on the web server, a response comprising the public key of the at least one cryptographic key pair. Generating the at least one cryptographic key pair may utilize one or more cryptographic libraries of the web browser and/or a Trusted Platform Module (TPM) of the given client device. In some embodiments, generating the at least one cryptographic key pair may further comprise storing the private key of the at least one cryptographic key pair in a key vault of at least one of an operating system of the given client device and a hardware processor of the given client device. The secure storage of the given client device accessible to the web browser may enforce one or more security policies for sealing the private key of the at least one cryptographic key pair in the secure storage using device attestation of a TPM of the given client device. The one or more security policies may require at least one of a one-time passcode and biometric authentication of the given user for accessing the private key of the at least one cryptographic key pair in the secure storage of the given client device. The given client device may be part of a collection of devices that are under management by some entity, and which are capable of being managed within a particular security context. In some cases, the given user may be associated with at least one enterprise system, and the one or more security policies are specified by the enterprise system at an organizational level.

The request for creating the at least one cryptographic key pair may comprise an HTTP response message, and receiving the request may comprise parsing an HTTP Response Header of the HTTP response message to identify: an identifier of an encryption algorithm to be utilized for generating the at least one cryptographic key pair; a domain where the request is valid, the domain defining a scope where use of the at least one cryptographic key pair is allowed to be used and a namespace where the at least one cryptographic key pair exists; a name of the at least one cryptographic key pair that uniquely identifies the at least one cryptographic key pair within the scope of the domain; and a redirect URL, wherein the response comprising the public key of the at least one cryptographic key pair is provided via the redirect URL. The response comprising the public key of the at least one cryptographic key pair may comprise an HTTP request message, the HTTP request message comprising an HTTP Request Header including elements for the identifier of the encryption algorithm, the domain, the name of the at least one cryptographic key pair, and the public key of the at least one cryptographic key pair. It should be appreciated that various other information or elements may be made part of the HTTP Request Header and more generally the HTTP request message.

Illustrative embodiments provide techniques for permitting a web browser (e.g., on a client device) to access a secure key store to enable signing of remotely generated requests (e.g., for accessing IT assets in an IT infrastructure). The solutions described herein enable a specific user who is using a single web browser to conduct secured remote privileged actions using durable cryptographic key enablement. Advantageously, the solutions described herein provide methods for a private key to be generated and kept accessible only by a user's private system (e.g., potentially forever, or for as long as desired), while allowing websites to attest that requests originate at the user's private system. As will be discussed in further detail below, the solutions described herein are independent of the key generation method used. Depending on the use case, various different key generation methods may be used, including but not limited to Rivest Shamir Adleman (RSA) asymmetric encryption algorithms, Elliptic Curve Digital Signature Algorithm (ECDSA) or Elliptic Curve Cryptography (ECC), etc.

In some embodiments, a web server can request that a web browser create a cryptographic key pair (also referred to as a public/private key pair or simply as a key pair), which can subsequently be used by the web server to sign documents, requests or other types of messages (also referred to herein as "certificates") on behalf of a user of the web browser. This key pair can be used in various use case scenarios where a user interacts (e.g., via a web browser) with a web-based service that is used to manage or authorize actions or other remote services. Asymmetric key encryption can be used to allow users or services to independently verify that a given "certificate" or message was signed by or using another specific user key. Only the holder of the private key of a key pair can sign such a message, but any user with access to the public key of the key pair can verify that the message was signed by the holder of the private key of the key pair.

Illustrative embodiments provide a method for the private key of a key pair to be generated and made forever (or as long as is desired) accessible only by a user's private system, while allowing a web site or web service running on a web server to attest that documents, requests or other types of messages (also referred to as "certificates") came from that user. The web site or web service can then authorize privileged remote actions that will be executed using asymmetric key enablement. The web site or web service can request that a client device create and store a durable public/private key pair in a safe vaulted area for continued use by that web site or web service, using web browser-based methods. As noted above, the solutions described herein are independent of the key generation method used to generate the public/private key pair.

The solutions described herein provide a novel approach to enable a specific user who is using a single web browser to conduct secured remote privileged actions using durable cryptographic key enablement. The solutions described herein also provide methods for a private key (e.g., of a key pair used for conducting secured remote privileged actions) to be generated and kept accessible only by a user's private system, while allowing a web site or web service to attest that requests came from that user.

Confidentiality and security of highly distributed systems are important tasks. In most distributed systems, a web server performs its own authorization and identity management to identify a user (e.g., that is submitting requests). If a highly distributed system, however, provides a management plane used to authorize actions on other servers or nodes (e.g., IT assets), then the web server or servers implementing the management plane would be the one who would authorize or have the physical authority to authorize other servers or nodes. The solutions described herein allow the private key of the key pair, and therefore authority, to remain in the hands of the user at all times through its lifecycle. This advantageously enables distributed and disaggregated security models to be created and built using modern web browser-based applications and infrastructures.

The solutions described herein provide methods by which a web server (e.g., an application or web service running on a web server) can request a user's web browser to generate a public/private key pair, for which the web server can then make requests for the web browser to digitally sign documents, requests or other messages. This advantageously enables public verification that a message was indeed signed by the user on a particular machine or client device. To do so, a protocol is implemented by which a web page (e.g., that is generated on or by a web server, or an application or service running thereon) can request such signatures as well as generation of public/private key pairs. Such signature requests, and requests for generation of public/private key pairs, may be achieved by placing customer header fields in an HTTP Response Header. The user's web browser can convey back a generated public key and/or signatures (e.g., of documents, requests or other types of messages) via custom fields in an HTTP Request Header.

On the web server side, custom code may be implemented to generate requests (e.g., for public/private key pairs, for signatures of messages, etc.). On the web browser side, custom code may also be implemented (e.g., where the custom code may be built into the web browser itself, or added through custom web browser extensions). The code in the web browser, for example, scans HTTP Response Headers for requests from the web server, executes them if it finds them, and then returns responses in an outgoing web page which it is redirected to (e.g., a web page that the web browser is told to go to upon completion).

Various different processes may be used by a web browser (or an extension thereof) for carrying out key generation, storage and signature operations. In some embodiments, public-domain libraries such as OpenSSL are used by which a developer can write code for key generation, storage and signature operations. In other embodiments, an operating system (OS) or hardware platform may provide better and stronger ways of performing key generation, storage and signature operations (e.g., using security libraries, key vaults, TPMs, etc., which provide even more robust security for this kind of information). Thus, some implementations can leverage the abilities of a given platform on which a web browser runs (e.g., the OS, hardware platform, etc.) to provide additional protection for the keys being generated, but this would be platform specific. Examples include systems and platforms which require passwords, one-time passcodes, fingerprint scanners, etc. to access key vaults. More importantly, such systems through OS or hardware platform security can sign messages with generated keys but can never reveal them (e.g., even to internal hardware or software of that OS or hardware platform).

Figure 3:
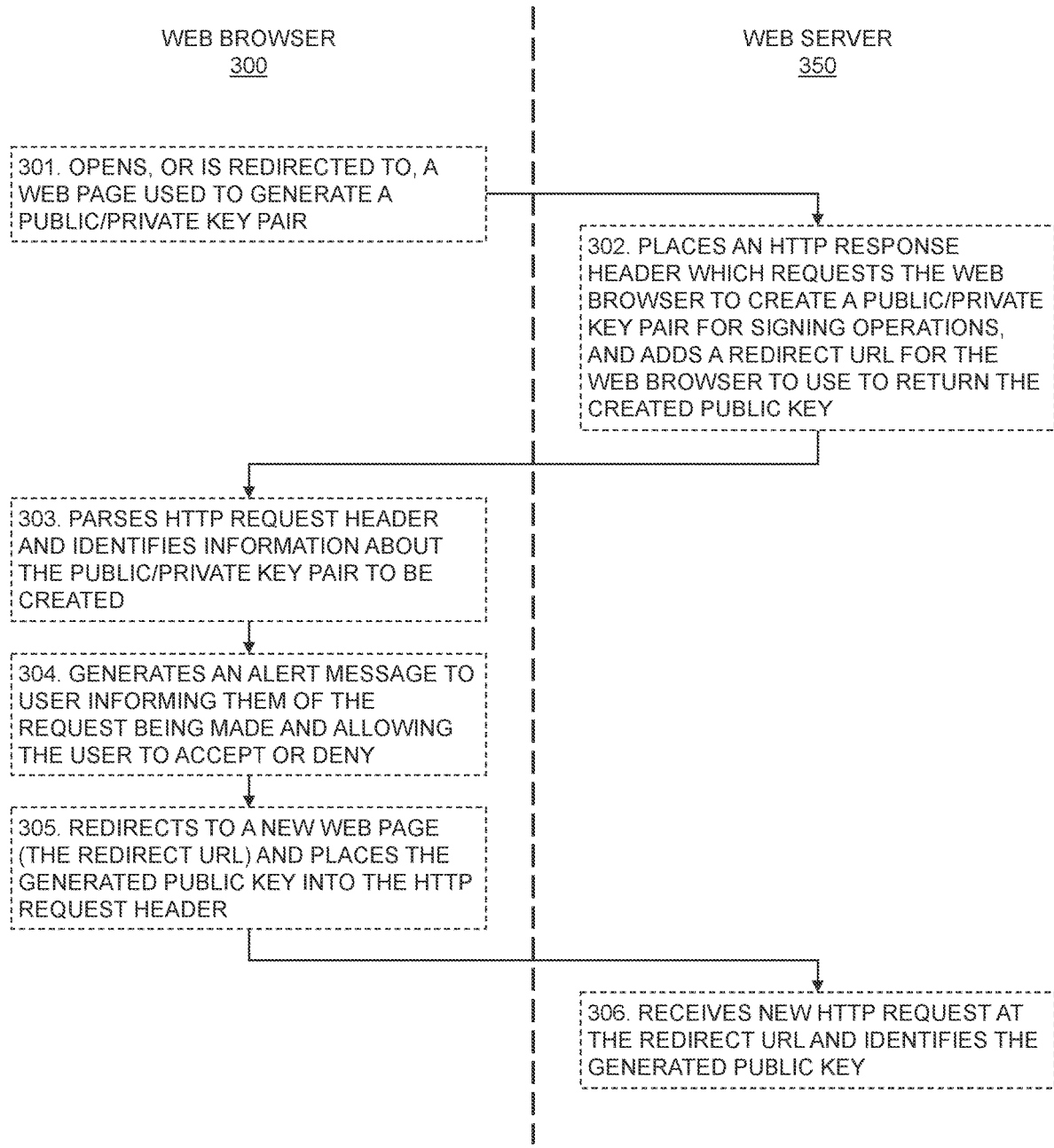
FIG. 3 shows a process flow for creating public/private key pairs in a web browser of a client device in an illustrative embodiment.

FIG. 3 shows a process flow for creation of a public/private key pair that is performed between a web browser 300 (e.g., running on a client device associated with a given user) and a web server 350. The FIG. 3 process flow specifies the handling of web pages, generated by the web server 350, which are received by a web browser 300, for secure generation and retention of public/private key pairs. In step 301, the web browser 300 opens, or is redirected to (e.g., by the web server 350), a web page that is used to generate a public/private key pair. In step 302, the web server 350, in rendering the web page, places an HTTP Response Header (discussed in further detail below) which requests that the web browser 300 create a public/private key pair on its behalf for future signing operations. The specifics of key generation requests are defined below. The web server 350 in step 302 also adds a redirect uniform resource locator (URL) which it expects the web browser 300 to use to return the created public key of the public/private key pair to.

In step 303, the web browser 300, upon receiving the web page, uses custom code (e.g., that is built in to the web browser 300, or is added as an extension to the web browser 300) to identify the HTTP Request Header. The web browser 300 parses the HTTP Request Header (described in further detail below), and identifies information about the public/private key pair that it is being requested to create. Such information may include, but is not limited to, a name or other identifier of the public/private key pair, usage rules, etc.

The web browser 300 in step 304 uses in-browser code to generate an alert message that is provided to the given user (e.g., via a graphical user interface (GUI)), where the alert message informs the given user of the request being made (e.g., creation of a public/private key pair with an associated name or other identifier and usage rules). The alert message allows the given user to accept or deny the request. If the given user chooses to accept the request, the code of the web browser 300 will in turn generate the public/private key pair in whatever implementation it may choose (e.g., using a cryptographic library like OpenSSL, using TPM hardware, etc.), and then stores the public/private key pair in an implementation-defined manner (e.g., retaining the generated private key of the public/private key pair in the TPM, storing the private key in an OS-specific key vault, saving the private key as a file on a local hard disk, where the file may be encrypted, etc.). The web browser 300 will also save the usage rules specified in the request.

The web browser 300 in step 305 immediately redirects to a new web page (e.g., the previously-supplied redirect URL sent to the web browser 300 in the previous HTTP Response Header). When doing so, the web browser 300 places the generated public key in an HTTP Request Header (discussed in further detail below). In step 306, the web server 350 receives the new HTTP request from the web browser 300, which is identifiable because the web server 350 was the one that gave the web browser 300 the redirect URL to use. The web server 350 looks for the public key of the generated public/private key pair in the HTTP Request Header. The web server 350 can then store the public key for future use (e.g., verification of signed messages). The web server 350 can also make the public key available to others (e.g., IT assets in an IT infrastructure) by signing a digital certificate, which would attest that the given user as known to the web server 350 (e.g., through the web server 350's own identity determination policies) was the rightful holder of the associated public key.

Figure 4:
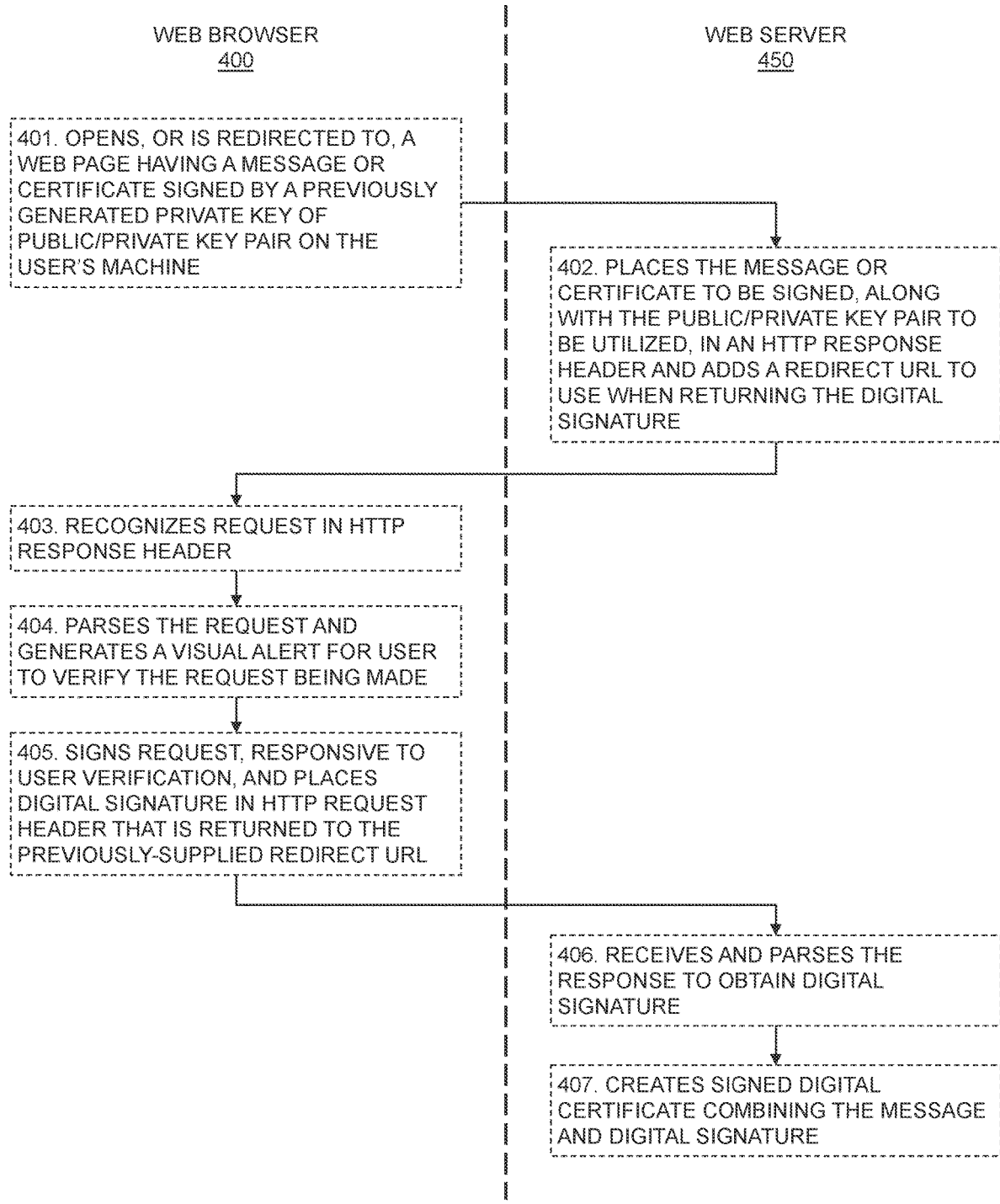
FIG. 4 shows a process flow for signing messages in a web browser of a client device in an illustrative embodiment.

FIG. 4 shows a process flow for signing of messages, from a web server 450, by a web browser 400 using a previously generated public/private key pair (e.g., generated using the FIG. 3 process flow). The FIG. 4 process flow specifies the handling of web pages, generated by the web server 450, which are received by a web browser 400, for allowing a given user to sign messages received from the web server 450. In step 401, the web browser 400 opens, or is redirected to, a web page that requests signature, using a previously-generated private key of a public/private key pair on the given user's machine, of one or more messages. The web server 450, in step 402, when rendering the requested web page, places in the HTTP Response Header of the web page the messages to be signed, along with information about the keys to be used for signing such messages. The web server 450 also includes a redirect URL which it will expect the web browser 400 to use when returning the digital signatures.

In step 403, the web browser 400, upon receiving the web page, uses custom code (e.g., that is built in to the web browser 400, or is added as an extension to the web browser 400) to identify the messages to be signed in the HTTP Response Header. The web browser 400 in step 404 parses specific fields of the HTTP Response Header and generates a visual alert (e.g., in a GUID) for the user to verify the certificate signature request(s) being made. Such alerts would give the user the option to view the cleartext of the messages being signed, as well as the option to accept (e.g., sign) or deny (e.g., not sign).

In step 405, if the user chooses to sign a given message, the web browser 400 will use the custom code and an implementation-defined method to sign the given message with an associated private key. The web browser 400 will then redirect itself to the redirect URL specified in the HTTP Response Header, which generates another HTTP request provided to the web server 450. The web browser 400 will place the calculated digital signature, generated from signing the given message using the associated private key, and returns that in an HTTP Request Header field.

In step 406, the web server 450 receives the new HTTP request from the web browser 400, which is identifiable because the web server 450 was the one that gave the web browser 400 the redirect URL to use. The web server 450 obtains from the HTTP Request Header the digital signature, the key identifier, and the requested message. The web server 450 in step 407 is able to create a signed digital certificate by placing the original message and the digital signature (obtained from the HTTP Request Header), in whatever form the web server 450 chooses.

It should be noted that the process flows shown in FIGS. 3 and 4 omit various steps for handling obvious error cases, such as when a key fails to generate, when a user denies a request to create a public/private key pair or denies a request sign a particular message, where a request for signature specifies a key that does not exist, etc.

HTTP header messages used in the FIGS. 3 and 4 process flows will now be described in further detail. Various HTTP header fields are used to convey information at various phases of the transactions of FIGS. 3 and 4 for creating public/private key pairs, and for signing requests using created public/private key pairs. A "create" public/private key pair request is generated by a web server (e.g., web server 350 in the FIG. 3 process flow), and is placed in an HTTP Response Header:

X-Generate-Keypair: <KeypairName>; <Algorithm>; <Domain>; <RedirectURL>; Secure

"KeypairName" uniquely identifies the name for a given public/private key pair. This name is only valid within the scope of the domain value specified below. In some embodiments, this name can contain any U.S. American Standard Code for Information Interchange (US-ASCII) characters except for the control character, space, and tab. The name should also not contain separator characters, such as: ( ) < > @ , ; : \ "/ [ ] ?={ }. "Algorithm" is an implementation-specific value representing the encryption method used for creation of the public/private key pair. This might be, for example, RSA or ECC. "Domain" defines the domain in which the request is allowed. The domain may only be a subset of the one for the current document URL, and contains at least two parts. For example, if the web page is site.example.com, valid domains would be either "site.example.com" or "example.com". This defines the scope where the generated public/private key pair may be used, and the namespace in which the KeypairName exists. "RedirectURL" is the URL which the browser will go to after creation of the public/private key pair to return the public key of the public/private key pair to the requesting web server. The redirect URL should be in a url-encoded format. "Secure" is an option value which specifies if HTTP Secure (HTTPS) is required for subsequent signing operations.

A "create" public/private key pair response is generated by a web browser (e.g., web browser 300 in the FIG. 3 process flow), and is placed in an HTTP Request Header:

X-Generated-Keypair: <KeypairName>; <Algorithm>; <Domain>; <PublicKey>

These fields are returned in an HTTP Request Header in the request to the previously-supplied redirect URL. The first three fields (e.g., "KeypairName", "Algorithm" and "Domain") are identical to what was passed in the initial request. "PublicKey" is a Base64-encoded representation of the generated public key.

A "sign" message request is generated by a web server (e.g., web server 450 in the FIG. 4 process flow) and is placed in an HTTP Response Header:

X-Sign-Message: <KeypairName>; <Algorithm>; <HashAlgorithm>; <hashvalue>; <Domain>; <RedirectURL>; <Message>

This request is used by the web server to request that a message be signed by a web browser with a previously-generated public/private key pair. The "KeypairName", "Algorithm" and "Domain" fields are the same as those originally used for key generation. "HashAlgorithm" is the name of the hash algorithm used to cryptographically hash and sign the message. It is implementation-specific, and may be something like "SHA1" or "SHA512". "HashValue" is the hash value calculated by the web server for the message being sent. Any discrepancy between the hash value calculated by the web server and the web browser constitutes a fatal error. "RedirectURL" is the URL which the web browser will open a request to after signing. "Message" is the message to be signed. It can contain any US-ASCII characters, except for: the control character, space, or a tab. It should also not contain separator characters such as: ( ) < >@ , ; : \ "/ [ ] ?={ }. Any non-permitted characters can be URL encoded.

A "sign" message response is generated by a web browser (e.g., web browser 400 in the FIG. 4 process flow), and is placed in an HTTP Request Header:

X-Signed-Message: <KeypairName>; <Algorithm>; <HashAlgorithm>; <hashvalue>; <Domain>; <RedirectURL>; <signature>; <Message>

The "KepairName", "Algorithm", "HashAlgorithm", "hashvalue", "Domain", "RedirectURL", and "Message" fields are the same as those used above. "Signature" is a hexadecimal representation of the digital signature generated by the signing process.

As noted above, different public/private key pairs may be associated with different sets of key usage rules and security. Key usage rules, for example, may specify how and when a given public/private key pair is to be used (e.g., for signing particular types of messages, for signing requests from different sources, etc.).

The solutions described herein give web browsers the ability to leverage secure keystores of their native platforms, to work on behalf of a user to authorize work being generated within a web platform for conveyance to other systems beyond a single web server. Various technologies are used to enable a user that is at one machine or client device to use a system of browser software and a web site to offer secure attestation by that user for messages to be delivered (even outside of that web site). Edge computing platforms may use the solutions described herein within a designed control plane which uses disaggregated key management in conjunction with cryptographically signed certificates which convey work requests to endpoints and delegate permissions.

A strength of the systems described herein derives from the principle that keys are best kept closer to their users, and that the authority they have is best kept out of a centralized, replicated control plane. This is due to the fact that such a centralized, replicated control plane may have a multitude of keys which could be used to control all aspects of a large, distributed edge environment. A centralized, replicated control plane therefore represents a vulnerable point of attack to breach control over a larger ecosystem. As such, the ability for stronger decentralized public/private key management is needed. This can be done via application software that runs on users' client devices (e.g., computers, smartphones, etc.). However, most administration of this type may be done through in-browser applications. Web browsers, however, do not have the ability (for security purposes) to create and store keys on a local machine or client device. Conventional approaches for such storage are inherently very insecure.

Furthermore, many services on local machines or client devices may be leveraged specifically to perform secure generation and usage of public/private key pairs. Such services include, by way of example, TPMs, key vaults, key managers, etc., both in hardware and in software. These services can further call upon even stricter security measures, like the use of facial recognition, fingerprint scanners, one-time passcodes, passwords, etc., that can protect keys inside things like hardware processors which are designed to be unreadable and can only be used to sign certificates under the strictest of security policies. This means that, in a system that was completely breached and had no supplemental security, a hardware device that protected keys and allows only signing would make it so a breacher could not steal the keys, but could potentially authorize things when running and connected directly on that system. It also means that if supplemental security policies were enforced (e.g., such as the use of one-time passwords), malicious code could not automatically sign any request without user intervention and approval. Some security policies, such as TPM sealing, use device attestation to "seal" keys in the TPM allowing them to be used only when the system is in a known good state. Supplemental security policies, in some embodiments, can be written and enforced on an organizational level (e.g., at the configuration and insistence of an IT department). Thus, the techniques described herein can provide a groundbreaking level of security, from endpoints all the way up to within an edge control plane.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for web browser-based secure cryptographic key management will now be described in greater detail with reference to FIGS. 5 and 6. Although described in the context of information processing system 100, these platforms may also be used to implement at least portions of other information processing systems in other embodiments.

Figure 5:
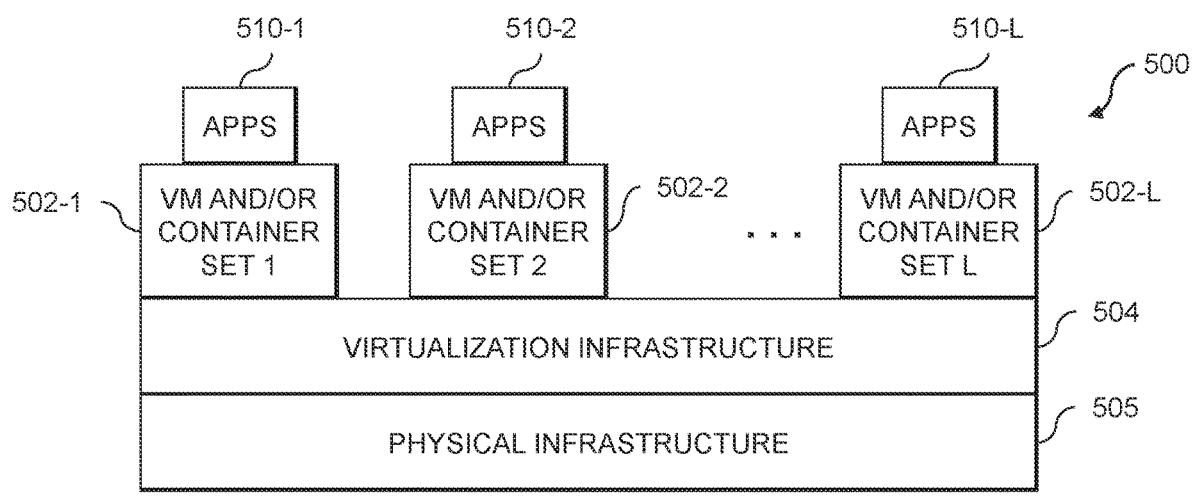
FIGS. 5 and 6 show examples of processing platforms that may be utilized to implement at least a portion of an information processing system in illustrative embodiments.
Figure 6:
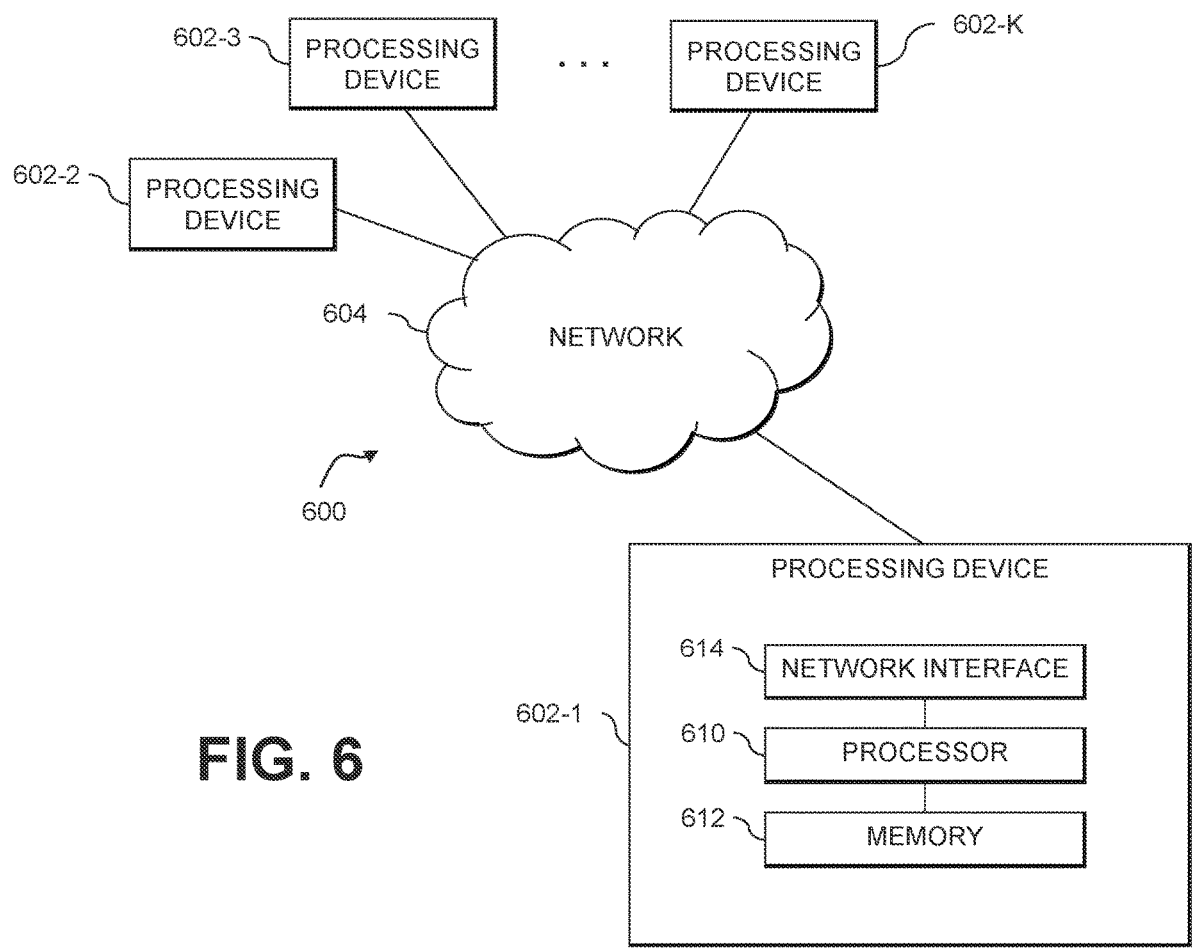

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 500 shown in FIG. may represent at least a portion of one processing platform. Another example of such a processing platform is processing platform 600 shown in FIG. 6.

The processing platform 600 in this embodiment comprises a portion of information processing system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for web browser-based secure cryptographic key management as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, signature algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        generating, by a web browser, at least one cryptographic key pair based at least in part on a key generation request received at the web browser from a web-based service running on a web server, the key generation request specifying one or more usage rules for the at least one cryptographic key pair;
        providing, from the web browser to the web-based service running on the web server, a public key of the at least one cryptographic key pair;
        maintaining, in secure storage of the at least one processing device accessible to the web browser, a private key of the at least one cryptographic key pair;
        receiving, at the web browser from the web-based service running on the web server, a signature request for signature of one or more messages using the at least one cryptographic key pair;
        verifying, at the web browser, whether the signature request is permitted by the one or more usage rules for the at least one cryptographic key pair specified in the key generation request;
        generating, at the web browser, one or more interface features permitting a given user to accept or deny the request for signature of the one or more messages;
        responsive to the given user accepting the request for signature of at least a given one of the one or more messages, digitally signing the given message utilizing the private key of the at least one cryptographic key pair; and
        providing, from the web browser to the web-based service running on the web server, a response comprising the digital signature of the given message.

2. The apparatus of claim 1 wherein the request for signature of the one or more messages comprises a Hypertext Transfer Protocol (HTTP) response message, and wherein receiving the request comprises parsing an HTTP Response Header of the HTTP response message to identify the one or more messages and the at least one cryptographic key pair to be utilized for signing the one or more messages.

3. The apparatus of claim 2 wherein parsing the HTTP Response Header of the HTTP response message further comprises identifying a redirect Uniform Resource Locator (URL), wherein the response comprising the digital signature of the given message is provided via the redirect URL.

4. The apparatus of claim 2 wherein parsing the HTTP Response Header of the HTTP response message further comprises identifying:
    an identifier of a hash algorithm to be utilized for digitally signing the one or more messages; and
    hash values of the one or more messages.

5. The apparatus of claim 2 wherein parsing the HTTP Response Header of the HTTP response message further comprises identifying a domain where the request is valid, the domain defining a scope where use of the at least one cryptographic key pair is allowed to be used and a namespace where the at least one cryptographic key pair exists.

6. The apparatus of claim 2 wherein the response comprising the digital signature of the given message provided from the web browser to the web-based service comprises an HTTP request message, the HTTP request message comprising an HTTP Request Header including the digital signature of the given message.

7. The apparatus of claim 1 wherein generating the at least one cryptographic key pair utilizes at least one of: one or more cryptographic libraries of the web browser; and a Trusted Platform Module (TPM) of the at least one processing device.

8. The apparatus of claim 1 wherein maintaining the private key of the at least one cryptographic key pair in the secure storage of the at least one processing device accessible to the web browser comprises storing the private key of the at least one cryptographic key pair in a key vault of at least one of an operating system of the at least one processing device and the processor of the at least one processing device.

9. The apparatus of claim 1 wherein the secure storage of the at least one processing device accessible to the web browser enforces one or more security policies for sealing the private key of the at least one cryptographic key pair in the secure storage using device attestation of a Trusted Platform Module (TPM) of the at least one processing device.

10. The apparatus of claim 9 wherein the one or more security policies require at least one of a one-time passcode and biometric authentication of the given user for accessing the private key of the at least one cryptographic key pair in the secure storage of the at least one processing device.

11. The apparatus of claim 9 wherein the given user is associated with at least one enterprise system, and wherein the one or more security policies are specified by the enterprise system at an organizational level.

12. The apparatus of claim 1 wherein the key generation request comprises a Hypertext Transfer Protocol (HTTP) response message, and wherein generating the at least one cryptographic key pair comprises parsing an HTTP Response Header of the HTTP response message to identify:
   an identifier of an encryption algorithm to be utilized for generating the at least one cryptographic key pair;
   a domain where the request is valid, the domain defining a scope where use of the at least one cryptographic key pair is allowed to be used and a namespace where the at least one cryptographic key pair exists;
   a name of the at least one cryptographic key pair that uniquely identifies the at least one cryptographic key pair within the scope of the domain; and
   a redirect Uniform Resource Locator (URL), wherein the response comprising the public key of the at least one cryptographic key pair is provided via the redirect URL.

13. The apparatus of claim 12 wherein the response comprising the public key of the at least one cryptographic key pair comprises an HTTP request message, the HTTP request message comprising an HTTP Request Header specifying the identifier of the encryption algorithm, the domain, the name of the at least one cryptographic key pair, and the public key of the at least one cryptographic key pair.

14. A computer program product comprising a non-transitory processor-readable storage medium having stored therein program code of one or more software programs, wherein the program code when executed by at least one processing device causes the at least one processing device to perform steps of:
   generating, by a web browser, at least one cryptographic key pair based at least in part on a key generation request received at the web browser from a web-based service running on a web server, the key generation request specifying one or more usage rules for the at least one cryptographic key pair;
   providing, from the web browser to the web-based service running on the web server, a public key of the at least one cryptographic key pair;
   maintaining, in secure storage of the at least one processing device accessible to the web browser, a private key of the at least one cryptographic key pair;
   receiving, at the web browser from the web-based service running on the web server, a signature request for signature of one or more messages using the at least one cryptographic key pair;
   verifying, at the web browser, whether the signature request is permitted by the one or more usage rules for the at least one cryptographic key pair specified in the key generation request;
   generating, at the web browser, one or more interface features permitting a given user to accept or deny the request for signature of the one or more messages;
   responsive to the given user accepting the request for signature of at least a given one of the one or more messages, digitally signing the given message utilizing the private key of the at least one cryptographic key pair; and
   providing, from the web browser to the web-based service running on the web server, a response comprising the digital signature of the given message.

15. The computer program product of claim 14 wherein the request for signature of the one or more messages comprises a Hypertext Transfer Protocol (HTTP) response message, and wherein receiving the request comprises parsing an HTTP Response Header of the HTTP response message to identify the one or more messages and the at least one cryptographic key pair to be utilized for signing the one or more messages.

16. The computer program product of claim 15 wherein parsing the HTTP Response Header of the HTTP response message further comprises identifying:
   a redirect Uniform Resource Locator (URL), wherein the response comprising the digital signature of the given message is provided via the redirect URL;
   an identifier of a hash algorithm to be utilized for digitally signing the one or more messages;
   hash values of the one or more messages; and
   a domain where the request is valid, the domain defining a scope where use of the at least one cryptographic key pair is allowed to be used and a namespace where the at least one cryptographic key pair exists.

17. A method performed by at least one processing device comprising a processor coupled to a memory, the method comprising:
   generating, by a web browser, at least one cryptographic key pair based at least in part on a key generation request received at the web browser from a web-based service running on a web server, the key generation request specifying one or more usage rules for the at least one cryptographic key pair;
   providing, from the web browser to the web-based service running on the web server, a public key of the at least one cryptographic key pair;
   maintaining, in secure storage of the at least one processing device accessible to the web browser, a private key of the at least one cryptographic key pair;
   receiving, at the web browser from the web-based service running on the web server, a signature request for signature of one or more messages using the at least one cryptographic key pair;
   verifying, at the web browser, whether the signature request is permitted by the one or more usage rules for the at least one cryptographic key pair specified in the key generation request;

generating, at the web browser, one or more interface features permitting a given user to accept or deny the request for signature of the one or more messages;

responsive to the given user accepting the request for signature of at least a given one of the one or more messages, digitally signing the given message utilizing the private key of the at least one cryptographic key pair; and providing, from the web browser to the web-based service running on the web server, a response comprising the digital signature of the given message.

18. The method of claim 17 wherein the request for signature of the one or more messages comprises a Hypertext Transfer Protocol (HTTP) response message, and wherein receiving the request comprises parsing an HTTP Response Header of the HTTP response message to identify the one or more messages and the at least one cryptographic key pair to be utilized for signing the one or more messages.

19. The method of claim 18 wherein parsing the HTTP Response Header of the HTTP response message further comprises identifying:

a redirect Uniform Resource Locator (URL), wherein the response comprising the digital signature of the given message is provided via the redirect URL;

an identifier of a hash algorithm to be utilized for digitally signing the one or more messages;

hash values of the one or more messages; and a domain where the request is valid, the domain defining a scope where use of the at least one cryptographic key pair is allowed to be used and a namespace where the at least one cryptographic key pair exists.

20. The apparatus of claim 1 wherein the one or more usage rules specify one or more website domains from which signature requests are permitted.

* * * * *